(12) United States Patent
Abe

(10) Patent No.: US 11,834,030 B2
(45) Date of Patent: Dec. 5, 2023

(54) VEHICLE, VEHICLE CONTROL DEVICE, STORAGE MEDIUM, AND VEHICLE CONTROL METHOD

(71) Applicant: HONDA MOTOR CO., LTD., Tokyo (JP)

(72) Inventor: Noriyuki Abe, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/679,233

(22) Filed: Feb. 24, 2022

(65) Prior Publication Data
US 2022/0314958 A1 Oct. 6, 2022

(30) Foreign Application Priority Data
Mar. 31, 2021 (JP) .................... 2021-060575

(51) Int. Cl.
| | |
|---|---|
| *B60W 10/30* | (2006.01) |
| *B60W 10/08* | (2006.01) |
| *H01R 13/629* | (2006.01) |
| *H02J 4/00* | (2006.01) |
| *B60W 10/24* | (2006.01) |

(52) U.S. Cl.
CPC ............ *B60W 10/30* (2013.01); *B60W 10/08* (2013.01); *B60W 10/24* (2013.01); *H01R 13/629* (2013.01); *H02J 4/00* (2013.01); *H01R 2201/26* (2013.01); *H02J 2310/48* (2020.01)

(58) Field of Classification Search
CPC ...... B60W 10/30; B60W 10/08; B60W 10/24; H02J 4/00; H02J 2310/48
See application file for complete search history.

(56) References Cited

U.S. PATENT DOCUMENTS

| | | | | |
|---|---|---|---|---|
| 5,764,502 A | * | 6/1998 | Morgan .................... | H02J 4/00 307/73 |
| 6,329,772 B1 | * | 12/2001 | Ochiai .................. | B60L 3/0069 318/140 |
| 2006/0222909 A1 | * | 10/2006 | Aoyagi ............. | H01M 8/04365 429/513 |
| 2010/0065349 A1 | * | 3/2010 | Ichikawa ................ | B60L 53/18 307/29 |

(Continued)

FOREIGN PATENT DOCUMENTS

JP 2020-099104 6/2020

*Primary Examiner* — Frank B Vanaman
(74) *Attorney, Agent, or Firm* — AMIN, TUROCY & WATSON, LLP

(57) ABSTRACT

A vehicle includes a drive system ground fault determination unit configured to determine that, when the first magnetic contactor is in a conduction state, the drive system electrical system has a ground fault when a ground stray capacitance of the drive system electrical system measured by a drive system ground fault sensor included in the drive system electrical system exceeds a drive system conduction state threshold value, and to determine that, when the first magnetic contactor is in a non-conduction state, the drive system electrical system has a ground fault when the ground stray capacitance of the drive system electrical system measured by the drive system ground fault sensor exceeds a drive system non-conduction state threshold value, which is different from the drive system conduction state threshold value.

6 Claims, 5 Drawing Sheets

(56) References Cited

U.S. PATENT DOCUMENTS

| | | | |
|---|---|---|---|
| 2011/0101915 A1* | 5/2011 | Mitsutani | B60L 53/305 320/109 |
| 2011/0133549 A1* | 6/2011 | Song | B60W 10/30 180/65.265 |
| 2011/0210698 A1* | 9/2011 | Sakai | H02J 7/04 320/109 |
| 2013/0154264 A1* | 6/2013 | Hatanaka | B60L 15/007 290/45 |
| 2013/0200690 A1* | 8/2013 | Rini | B60L 58/18 307/9.1 |
| 2015/0333527 A1* | 11/2015 | Rideau | H02J 9/00 307/31 |

\* cited by examiner

VEHICLE, VEHICLE CONTROL DEVICE, STORAGE MEDIUM, AND VEHICLE CONTROL METHOD

CROSS-REFERENCE TO RELATED APPLICATION

Priority is claimed on Japanese Patent Application No. 2021-060575, filed Mar. 31, 2021, the content of which is incorporated herein by reference.

BACKGROUND OF THE INVENTION

Field of the Invention

The present invention relates to a vehicle, a vehicle control device, a storage medium, and a vehicle control method.

Description of Related Art

In recent years, vehicles having a motor as a power source, such as electric vehicles (EV), hybrid vehicles (HV), and fuel cell vehicles (FCV), have become widely spread. It has been proposed to use a vehicle as a room while using an audio device, a video device, an air conditioner, and the like mounted indoors in the vehicle when a battery mounted in these vehicles is charged.

As a technology for using a vehicle as a room, for example, there is a charging system disclosed in Japanese Unexamined Patent Application, First Publication No. 2020-99104. In the charging system, when a vehicle is used as a room in my room mode, the traveling drive unit and all auxiliary machines can be used with both a charging relay and a system main relay connected.

SUMMARY OF THE INVENTION

However, the disconnection detection device described above may accelerate a deterioration of electronic components included in a traveling drive unit because it connects a drive battery and a traveling drive unit even when a vehicle is used as a room and it is not necessary to use the traveling drive unit.

Aspects according to the present invention have been made in consideration of such circumstances, and one of objects thereof is to provide a vehicle, a vehicle control device, a storage medium, and a vehicle control method capable of suppressing a deterioration of electronic components included in an electric system of the vehicle.

The present invention has adopted the following configuration to achieve the object to solve the problems described above.

(1): A vehicle according to one aspect of the present invention includes a drive system electrical system configured to supply power to a driver system, a non-drive system electrical system configured to supply power to a non-drive system, a first magnetic contactor that is electrically connected between the drive system electrical system and the non-drive system electrical system, a second magnetic contactor that is electrically connected between a power supply system configured to supply power to the non-drive system electrical system and the non-drive system electrical system, and a magnetic contactor control unit configured to execute at least one of first control processing of setting the first magnetic contactor to a non-conduction state when the non-drive system electrical system does not operate by using a DC power supply included in the drive system electrical system and second control processing of setting the second magnetic contactor to a non-conduction state when the non-drive system electrical system does not operate by using the power supply system.

(2): In the aspect of (1) described above, the vehicle may further include a first ground fault determination unit configured to determine that, when the first magnetic contactor is in a conduction state, the drive system electrical system has a ground fault when a ground stray capacitance of the drive system electrical system measured by a first ground fault sensor included in the drive system electrical system exceeds a first conduction state threshold value, and to determine that, when the first magnetic contactor is in a non-conduction state, the drive system electrical system has a ground fault when the ground stray capacitance of the drive system electrical system measured by the first ground fault sensor exceeds a first non-conduction state threshold value, which is different from the first conduction state threshold value.

(3): In the aspect of (1) or (2) described above, the vehicle may further include a second ground fault determination unit configured to determine that, when the second magnetic contactor is in a conduction state, the non-drive system electrical system has a ground fault when a ground stray capacitance of the non-drive system electrical system measured by a second ground fault sensor included in the non-drive system electrical system exceeds a second conduction state threshold value, and to determine that, when the second magnetic contactor is in a non-conduction state, the non-drive system electrical system has a ground fault when the ground stray capacitance of the non-drive system electrical system measured by the second ground fault sensor exceeds a second non-conduction state threshold value, which is different from the second conduction state threshold value.

(4): In the aspect of any one of (1) to (3) described above, the vehicle may further include the power supply system.

(5): A vehicle control device according to another aspect of the present invention includes a magnetic contactor control unit configured to execute at least one of first control processing of setting a first magnetic contactor electrically connected between a non-drive system electrical system, which supplies power to a non-drive system of a vehicle, and a drive system electrical system, which supplies power to a drive system of the vehicle, to a non-conduction state when the non-drive system electrical system does not operate by using a DC power supply included in the drive system electrical system and second control processing of setting a second magnetic contactor electrically connected between the non-drive system electrical system and a power supply system to the non-conduction state when the non-drive system electrical system does not operate by using the power supply system that supplies power to the non-drive system electrical system (6): A computer-readable non-transitory storage medium according to still another aspect of the present invention stores a vehicle control program that causes a computer to execute realizing a vehicle control function of including a magnetic contactor control unit that executes at least one of first control processing of setting a first magnetic contactor electrically connected between a non-drive system electrical system, which supplies power to a non-drive system of a vehicle, and a drive system electrical system, which supplies power to a drive system of the vehicle, to a non-conduction state when the non-drive system electrical system does not operate by using a DC power supply included in the drive system electrical system and second control processing of setting a second magnetic contactor electrically connected between the non-drive system electrical system and a power supply system to the non-conduction state when the non-drive system electrical system does not operate by using the power supply system that supplies power to the non-drive system electrical system.

(7): A vehicle control method according to still another aspect of the present invention includes, by a computer, executing at least one of first control processing of setting a first magnetic contactor electrically connected between a non-drive system electrical system, which supplies power to a non-drive system of a vehicle, and a drive system electrical system, which supplies power to a drive system of the vehicle, to a non-conduction state when the non-drive system electrical system does not operate by using a DC power supply included in the drive system electrical system and second control processing of setting a second magnetic contactor electrically connected between the non-drive system electrical system and a power supply system to the non-conduction state when the non-drive system electrical system does not operate by using the power supply system that supplies power to the non-drive system electrical system.

According to (1) to (4), the vehicle sets the first magnetic contactor to the non-conduction state and reduces time during which power is supplied from the drive system electrical system to the non-drive system electrical system when the non-drive system electrical system does not operate by using the DC power supply included in the drive system electrical system. According to (1) to (4), the vehicle sets the second magnetic contactor to the non-conduction state and reduces time during which power is supplied from the power supply system to at least one of the non-drive system electrical system and the drive system electrical system when the non-drive system electrical system does not operate by using the power supply system. Therefore, according to (1) to (4), the vehicle can reduce time during which power is supplied to at least one of an electronic device included in the non-drive system electrical system and an electronic device included in the drive system electrical system, and suppress a deterioration of these electronic devices.

According to (2), the vehicle determines whether the drive system electrical system has a ground fault by using the first conduction state threshold value set according to a range in which the ground stray capacitance of the drive system electrical system can take when the first magnetic contactor is in the conduction state. According to (2), the vehicle determines whether the drive system electrical system has a ground fault by using the first non-conduction state threshold value set according to a range in which the ground stray capacitance of the drive system electrical system can take when the first magnetic contactor is in the non-conduction state. Therefore, according to (2), the vehicle can accurately determine whether the drive system electrical system has a ground fault regardless of when the first magnetic contactor is in the conduction state or when the first magnetic contactor is in the non-conduction state.

According to (3), the vehicle determines whether the non-drive system electrical system has a ground fault by using the second conduction state threshold value set according to a range in which the ground stray capacitance of the non-drive system electrical system can take when the second magnetic contactor is in the conduction state. According to (3), the vehicle determines whether the non-drive system electrical system has a ground fault by using the second non-conduction state threshold value set according to a range in which the ground stray capacitance of the non-drive system electrical system can take when the second magnetic contactor is in the non-conduction state. Therefore, according to (3), the vehicle can accurately determine whether the non-drive system electrical system has a ground fault regardless of when the second magnetic contactor is in the conduction state or when the second magnetic contactor is in the non-conduction state.

According to (5), the vehicle control device sets the first magnetic contactor to the non-conduction state and reduces time during which power is supplied from the drive system electrical system to the non-drive system electrical system when the non-drive system electrical system does not operate by using the DC power supply included in the drive system electrical system. According to (5), the vehicle control device sets the second magnetic contactor to the non-conduction state and reduces time during which power is supplied from the power supply system to at least one of the non-drive system electrical system and the drive system electrical system when the non-drive system electrical system does not operate by using the power supply system. Therefore, according to (5), the vehicle control device can reduce time during which power is supplied to at least one of an electronic device included in the non-drive system electrical system and an electronic device included in the drive system electrical system, and suppress a deterioration of these electronic devices.

According to (6), the storage medium sets the first magnetic contactor to the non-conduction state and reduces time during which power is supplied from the drive system electrical system to the non-drive system electrical system when the non-drive system electrical system does not operate by using the DC power supply included in the drive system electrical system. According to (6), the storage medium sets the second magnetic contactor to the non-conduction state and reduces time during which power is supplied from the power supply system to at least one of the non-drive system electrical system and the drive system electrical system when the non-drive system electrical system does not operate by using the power supply system. Therefore, according to (6), the storage medium can reduce time during which power is supplied to at least one of an electronic device included in the non-drive system electrical system and an electronic device included in the drive system electrical system, and suppress a deterioration of these electronic devices.

According to (7), a vehicle control method sets the first magnetic contactor to the non-conduction state and reduces time during which power is supplied from the drive system electrical system to the non-drive system electrical system when the non-drive system electrical system does not operate by using the DC power supply included in the drive system electrical system. According to (7), the vehicle control method sets the second magnetic contactor to the non-conduction state and reduces time during which power is supplied from the power supply system to at least one of the non-drive system electrical system and the drive system electrical system when the non-drive system electrical system does not operate by using the power supply system. Therefore, according to (7), the vehicle control method can reduce time during which power is supplied to at least one of an electronic device included in the non-drive system electrical system and an electronic device included in the drive system electrical system, and suppress a deterioration of these electronic devices.

DETAILED DESCRIPTION OF THE INVENTION

Hereinafter, an embodiment of a vehicle, a vehicle control device, a vehicle control program, a vehicle control method, and a storage medium according to the present invention will be described with reference to the drawings.

Embodiment

Figure 1:
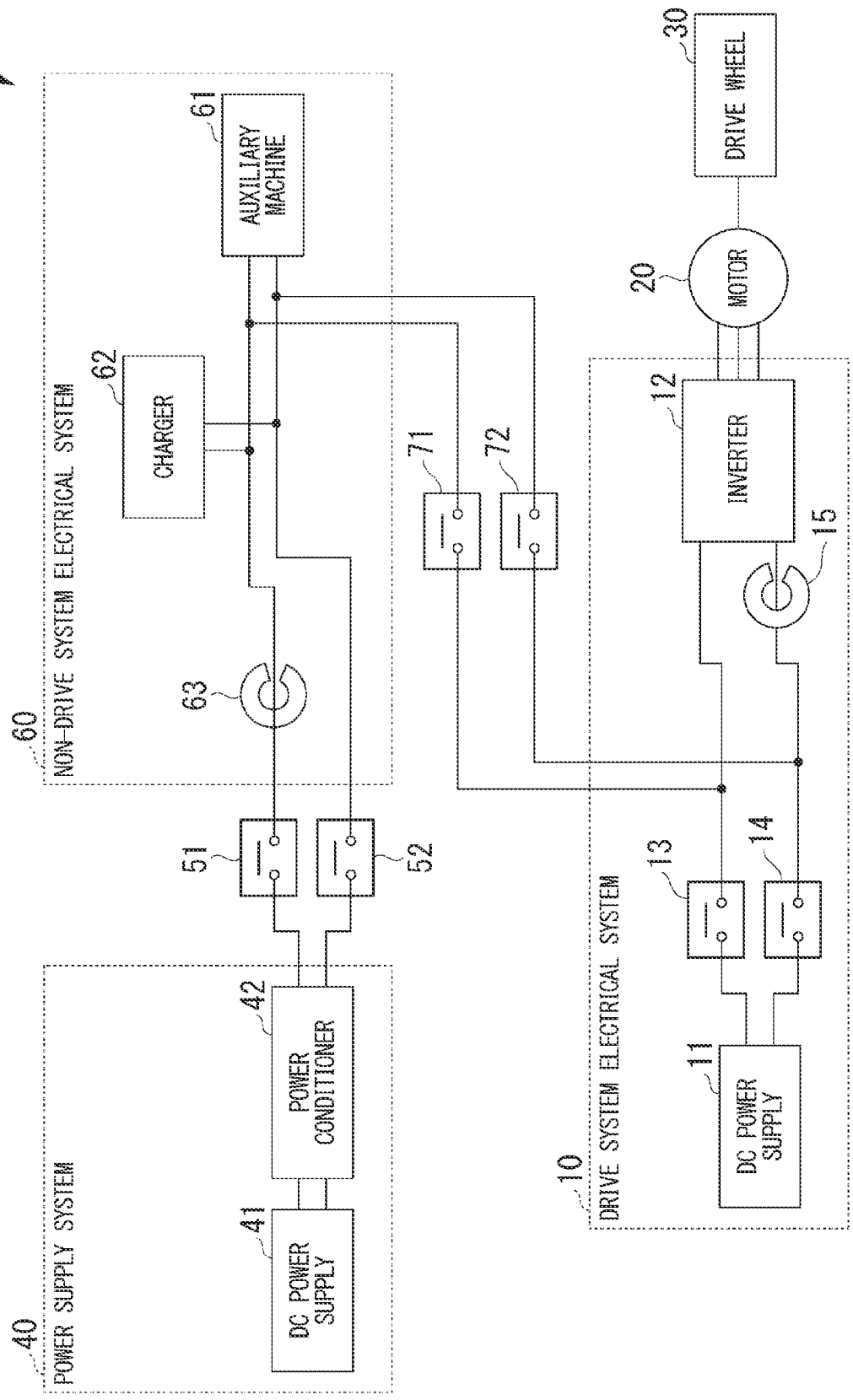
FIG. 1 is a diagram which shows an example of a vehicle according to an embodiment.

First, a vehicle according to an embodiment will be described with reference to FIG. 1. FIG. 1 is a diagram which shows an example of the vehicle according to the embodiment. A vehicle 1 shown in FIG. 1 is, for example, an electric vehicle, a hybrid vehicle, or a fuel cell vehicle. The vehicle 1 includes, for example, as shown in FIG. 1, a drive system electrical system 10, a motor 20, a drive wheel 30, a power supply system 40, a magnetic contactor 51, a magnetic contactor 52, a non-drive system electrical system 60, a magnetic contactor 71, and a magnetic contactor 72.

The drive system electrical system 10 is an electrical system that supplies power to a drive system that causes the vehicle 1 to travel. The drive system electrical system 10 includes, for example, a DC power supply 11, an inverter 12, a magnetic contactor 13, a magnetic contactor 14, and a first ground fault sensor 15, as shown in FIG. 1.

The DC power supply 11 is, for example, a secondary battery such as a lithium-ion battery, and generates DC power to supply it to an inverter 12. The inverter 12 converts the DC power supplied from the DC power supply 11 into AC power and supplies it to the motor 20.

The magnetic contactor 13 and the magnetic contactor 14 are electrically connected to the DC power supply 11 and the inverter 12. The magnetic contactor 13 and the magnetic contactor 14 are in a conduction state in which a current is passed when the DC power generated by the DC power supply 11 is supplied to at least one of the inverter 12 and the non-drive system electrical system 60. On the other hand, the magnetic contactor 13 and the magnetic contactor 14 are in a non-conduction state in which current is not passed when the DC power generated by the DC power supply 11 is not supplied to either the inverter 12 or the non-drive system electrical system 60.

The first ground fault sensor 15 measures a ground stray capacitance of the drive system electrical system 10 and generates first ground stray capacitance data indicating the ground stray capacitance. The ground stray capacitance herein is, for example, a stray capacitance between the drive system electrical system 10 and an exterior of the vehicle 1. The first ground fault sensor 15 has a first conduction state threshold value set therein, which is used to determine whether the drive system electrical system 10 has a ground fault when the magnetic contactor 71 and the magnetic contactor 72, which are examples of a first magnetic contactor, are in the conduction state. Furthermore, the first ground fault sensor has a first non-conduction state threshold value set therein, which is used to determine whether the drive system electrical system 10 has a ground fault when the magnetic contactor 71 and the magnetic contactor 72, which are examples of the first magnetic contactor, are in the non-conduction state.

The motor 20 converts AC power supplied from the inverter 12 into mechanical energy. This mechanical energy is transmitted to the drive wheel 30 by gears, shafts, and the like. The drive wheel 30 is driven by this mechanical energy.

The power supply system 40 includes, for example, a DC power supply 41 and a power conditioner 42 as shown in FIG. 1.

The DC power supply 41 is, for example, a solar power panel and a storage battery, and generates DC power and supplies it to the inverter 12. The power conditioner 42 converts the DC power supplied from the DC power supply 41 into AC power and supplies it to the non-drive system electrical system 60. The power supply system 40 may be installed in a house or the like instead of the vehicle 1.

As shown in FIG. 1, the magnetic contactor 51 and the magnetic contactor 52 are electrically connected to the power supply system 40 and the non-drive system electrical system 60. The magnetic contactor 51 and the magnetic contactor 52 are in the conduction state in which a current is passed when the AC power generated by the power supply system 40 is supplied to at least one of the drive system electrical system 10 and the non-drive system electrical system 60. On the other hand, the magnetic contactor 51 and the magnetic contactor 52 are in the non-conduction state in which a current is not passed when the AC power generated by the power supply system 40 is not supplied to either the drive system electrical system 10 or the non-drive system electrical system 60. Both the magnetic contactor 51 and the magnetic contactor 52 are examples of a second magnetic contactor.

The non-drive system electrical system 60 is an electrical system that supplies power to a non-drive system that is used for purposes other than a purpose of causing the vehicle 1 to travel. The non-drive system electrical system 60 includes, for example, an auxiliary machine 61, a charger 62, and a second ground fault sensor 63, as shown in FIG. 1.

The auxiliary machine 61 is a device used for purposes other than the purpose of causing the vehicle 1 to travel. Examples of the auxiliary machine 61 include an air conditioner, an audio, a radio, and a touch panel display. The charger 62 is used for a purpose of charging the DC power supply 11.

The second ground fault sensor 63 measures a ground stray capacitance of the non-drive system electrical system 60 and generates second ground stray capacitance data indicating the ground stray capacitance. The ground stray capacitance herein is, for example, a stray capacitance between the non-drive system electrical system 60 and the exterior of the vehicle 1. The second ground fault sensor 63 has a second conduction state threshold value set therein, which is used to determine whether the non-drive system electrical system 60 has a ground fault when the magnetic contactor 51 and the magnetic contactor 52, which are examples of the second magnetic contactor, are in the conduction state. Furthermore, the second ground fault sensor 63 has a second non-conduction state threshold value set therein, which is used to determine whether the non-drive system electrical system 60 has a ground fault when the magnetic contactor 51 and the magnetic contactor 52, which are examples of the second magnetic contactor, are in the non-conduction state.

As shown in FIG. 1, the magnetic contactor 71 and the magnetic contactor 72 are electrically connected to the drive system electrical system 10 and the non-drive system electrical system 60. The magnetic contactor 71 and the magnetic contactor 72 are in the conduction state that is a state in which a current is passed when the DC power generated by the DC power supply 11 is supplied to the non-drive system electrical system 60 or when the DC power supply 11 is charged using the charger 62. On the other hand, the magnetic contactor 71 and the magnetic contactor 72 are in the non-conduction state that is a state in which a current is not passed neither when the DC power generated by the DC power supply 11 is supplied to the non-drive system electrical system 60 nor when the DC power supply 11 is charged using the charger 62. Both the magnetic contactor 71 and the magnetic contactor 72 are examples of the first magnetic contactor.

The drive system electrical system 10, the power supply system 40, and the non-drive system electrical system 60 may all be realized as a module in which electronic components or the like are mounted on one board, or may be realized by electronic components or the like being mounted on each of a plurality of boards. However, when at least one of the drive system electrical system 10, the power supply system 40, and the non-drive system electrical system 60 is realized as a module, there is an advantage that an inspection, a repair, a replacement, and the like of these systems become easy.

Figure 2:
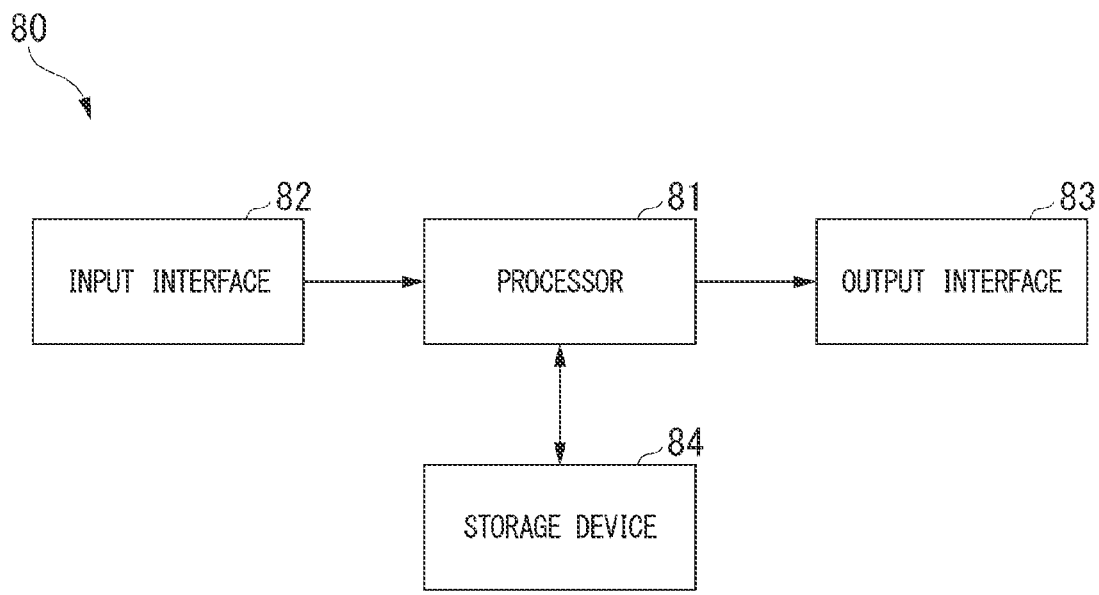
FIG. 2 is a diagram which shows an example of a hardware configuration of a vehicle control device according to the embodiment.

Next, a hardware configuration of a vehicle control device according to an embodiment will be described with reference to FIG. 2. FIG. 2 is a diagram which shows an example of the hardware configuration of the vehicle control device according to the embodiment. The vehicle control device 80 shown in FIG. 2 is, for example, an electronic control unit (ECU) mounted in the vehicle 1. The vehicle control device 80 includes, for example, a processor 81, an input interface 82, an output interface 83, and a storage device 84, as shown in FIG. 2.

The processor 81 is, for example, a central processing unit (CPU), reads and executes a vehicle control program 800 described below, and realizes each function of the vehicle control device 80. The processor 81 may read and execute a program other than the vehicle control program 800 to realize each function of the vehicle 1.

The input interface 82 is an interface circuit for receiving data from an electronic control unit other than the vehicle control device 80, a sensor mounted in the vehicle 1, and the like. The input interface 82 receives data transmitted via a controller area network (CAN), a local interconnect network (LIN), or the like.

The output interface 83 is an interface circuit for transmitting data indicating a result of calculation by the processor 81 on the basis of the data received by the input interface 82. The output interface 83 transmits the data transmitted via CAN, LIN, or the like.

The storage device 84 is, for example, a random access memory (RAM), and stores programs other than the vehicle control program 800 read and executed by the processor 81 in advance. The storage device 84 may have a storage area in which data indicating the result calculated by the processor 81 is stored.

Figure 3:
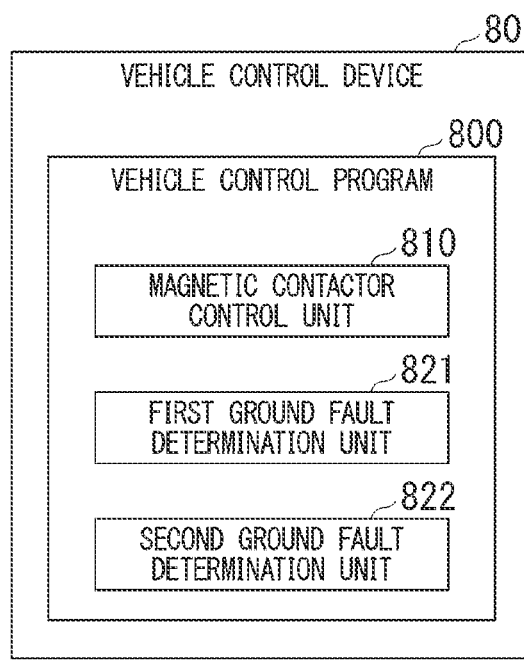
FIG. 3 is a diagram which shows an example of a software configuration of the vehicle control device according to the embodiment.

Next, a software configuration of the vehicle control device according to the embodiment will be described with reference to FIG. 3. FIG. 3 is a diagram which shows an example of the software configuration of the vehicle control device according to the embodiment. As shown in FIG. 3, the vehicle control device 80 is mounted in the vehicle 1 and includes a magnetic contactor control unit 810, a first ground fault determination unit 821, and a second ground fault determination unit 822.

At least a part of the functions of the vehicle control device 80 is realized, for example, by the hardware processor 81, which is hardware, executing the vehicle control program 800, which is software. At least a part of the functions of the vehicle control device 80 may be realized by hardware (a circuit unit; including circuitry) such as large scale integration (LSI), an application specific integrated circuit (ASIC), a field-programmable gate array (FPGA), a graphics processing unit (GPU), and the like, or may also be realized by software and hardware in cooperation.

The magnetic contactor control unit 810 determines whether the non-drive system electrical system 60 operates by using the DC power supply 11 included in the drive system electrical system 10.

Examples of a case where the non-drive system electrical system 60 operates by using the DC power supply 11 include, for example, a case where the DC power supply 41 cannot generate DC power because the DC power supply 41 is a solar power panel, and the vehicle 1 is traveling at night, in rainy weather, or the like. Alternatively, as such a case, since the DC power supply 41 is a storage battery and a charging rate (SOC: State Of Charge) of the storage battery is equal to or less than a predetermined charging rate, there is a case where the DC power supply 41 cannot supply sufficient DC power to cause the vehicle 1 to travel. Alternatively, as such a case, there is a case where ignition of the vehicle 1 is on. Alternatively, as such a case, there is a case where it is detected by a motion sensor mounted in the vehicle 1 that there is a person in the vehicle 1. The magnetic contactor control unit 810 determines, for example, that the non-drive system electrical system 60 operates by using the DC power supply 11 in these cases.

On the other hand, examples of a case where the non-drive system electrical system 60 does not operate by using the DC power supply 11 include, for example, a case where the DC power supply 41 can generate DC power because the DC power supply 41 is a solar power panel and the vehicle 1 is traveling on a sunny day. Alternatively, as such a case, since the DC power supply 41 is a storage battery and the charging rate (SOC: State of Charge) of the storage battery exceeds a predetermined charging rate, there is a case where the DC power supply 41 can supply sufficient DC power to cause the vehicle 1 to travel. Alternatively, as such a case, there is a case where the ignition of the vehicle 1 is off. Alternatively, as such a case, there is a case where it is not detected by the motion sensor mounted in the vehicle 1 that there is a person in the vehicle 1. The magnetic contactor control unit 810 determines, for example, in these cases, that the non-drive system electrical system 60 does not operate by using the DC power supply 11.

Then, the magnetic contactor control unit 810 executes first control processing of setting the magnetic contactor 71 and the magnetic contactor 72, which are examples of the first magnetic contactor, to the conduction state when it is determined that the non-drive system electrical system 60 operates by using the DC power supply 11 included in the drive system electrical system 10.

On the other hand, the magnetic contactor control unit 810 execute the first control processing of setting the magnetic contactor 71 and the magnetic contactor 72, which are examples of the first magnetic contactor, to the non-conduction state when it is determined that the non-drive system electrical system 60 does not operate using the DC power supply 11 included in the drive system electrical system 10.

The magnetic contactor control unit 810 determines whether the non-drive system electrical system 60 operates by using the power supply system 40.

Examples of a case where the non-drive system electrical system 60 operates by using the power supply system 40 include, for example, a case where the vehicle 1 is used as a room while the auxiliary machine 61 is used with the vehicle 1 stopped. Alternatively, as such a case, since the DC power supply 41 is a solar power panel and the vehicle 1 is traveling in a daytime in fine weather, there is a case where the DC power supply 41 can generate DC power. Alternatively, as such a case, since the DC power supply 41 is a storage battery and the charging rate of the storage battery exceeds a predetermined charging rate, there is a case where the DC power supply 41 can supply sufficient DC power to cause the vehicle 1 to travel. The magnetic contactor control unit 810 determines, for example, that the non-drive system electrical system 60 operates by using the power supply system 40 in these cases.

On the other hand, examples of a case where the non-drive system electrical system 60 does not operate by using the power supply system 40 include, for example, a case where the DC power supply 41 cannot generate DC power because the DC power supply 41 is a solar power panel and the vehicle 1 is traveling at night, in rainy weather, or the like. Alternatively, as such a case, since the DC power supply 41 is a storage battery and the charging rate of the storage battery is equal to or less than a predetermined charging rate, there is a case where the DC power supply 41 cannot supply sufficient DC power to cause the vehicle 1 to travel. The magnetic contactor control unit 810 determines, for example, that the non-drive system electrical system 60 does not operate by using the power supply system 40 in these cases.

Then, when it is determined that the non-drive system electrical system 60 operates by using the power supply system 40, the magnetic contactor control unit 810 executes second control processing of setting the magnetic contactor 51 and the magnetic contactor 52, which are examples of a second magnetic contactor, to the conduction state.

On the other hand, when it is determined that the non-drive system electrical system 60 does not operate by using the power supply system 40, the magnetic contactor control unit 810 executes the second control processing of setting the magnetic contactor 51 and the magnetic contactor 52, which are examples of the second magnetic contactor, to the non-conduction state.

When the magnetic contactor control unit 810 uses, for example, both the DC power supply 11 and the power supply system 40 to cause the vehicle 1 to travel while operating the auxiliary machine 61, it sets the magnetic contactor 51, the magnetic contactor 52, the magnetic contactor 71 and the magnetic contactor 72 to the conduction state.

The first ground fault determination unit 821 determines whether the first magnetic contactor is in the conduction state. That is, the first ground fault determination unit 821 determines whether the magnetic contactor 71 and the magnetic contactor 72 are in the conduction state.

When it is determined that the magnetic contactor 71 and the magnetic contactor 72 are in the conduction state, the first ground fault determination unit 821 determines whether the ground stray capacitance of the drive system electrical system 10 measured by the first ground fault sensor 15 exceeds the first conduction state threshold value on the basis of the first ground stray capacitance data described above.

Then, when it is determined that the ground stray capacitance of the drive system electrical system 10 measured by the first ground fault sensor 15 exceeds the first conduction state threshold value, the first ground fault determination unit 821 determines that the drive system electrical system 10 has a ground fault. On the other hand, when it is determined that the ground stray capacitance of the drive system electrical system 10 measured by the first ground fault sensor 15 is equal to or less than the first conduction state threshold value, the first ground fault determination unit 821 determines that the drive system electrical system 10 does not have a ground fault.

On the other hand, when it is determined that the magnetic contactor 71 and the magnetic contactor 72 are in the non-conduction state, the first ground fault determination unit 821 determines whether the ground stray capacitance of the drive system electrical system 10 measured by the first ground fault sensor 15 exceeds a first non-conduction state threshold value on the basis of the first ground stray capacitance data described above.

Then, when the first ground fault determination unit 821 determines that the ground stray capacitance of the drive system electrical system 10 measured by the first ground fault sensor 15 exceeds the first non-conduction state threshold value, it determines that the drive system electrical system 10 has a ground fault. On the other hand, the first ground fault determination unit 821 determines that the drive system electrical system 10 does not have a ground fault.

The second ground fault determination unit 822 determines whether the second magnetic contactor is in the conduction state. That is, the second ground fault determination unit 822 determines whether the magnetic contactor 51 and the magnetic contactor 52 are in the conduction state.

When the second ground fault determination unit 822 determines that the magnetic contactor 51 and the magnetic contactor 52 are in the conduction state, it determines whether the ground stray capacitance of the non-drive system electrical system 60 measured by the second ground fault sensor 63 exceeds the second conduction state threshold value on the basis of the second ground stray capacitance data described above.

Then, when the second ground fault determination unit 822 determines that the ground stray capacitance of the non-drive system electrical system 60 measured by the second ground fault sensor 63 exceeds the second conduction state threshold value, it determines that the drive system electrical system 10 has a ground fault. On the other hand, when the second ground fault determination unit 822 determines that the ground stray capacitance of the non-drive system electrical system 60 measured by the second ground fault sensor 63 is equal to or less than the second conduction state threshold value, it determines that the drive system electrical system 10 does not have a ground fault.

On the other hand, when it is determined that the magnetic contactor 51 and the magnetic contactor 52 are in the non-conduction state, the second ground fault determination unit 822 determines whether the ground stray capacitance of the non-drive system electrical system 60 measured by the second ground fault sensor 63 exceeds the second non-conduction state threshold value on the basis of the second ground stray capacitance data.

Then, when the second ground fault determination unit 822 determines that the ground stray capacitance of the non-drive system electrical system 60 measured by the second ground fault sensor 63 exceeds the second non-conduction state threshold value, it determines that the drive system electrical system 60 has a ground fault. On the other hand, the second ground fault determination unit 822 determines that the non-drive system electrical system 60 does not have a ground fault.

Figure 4:
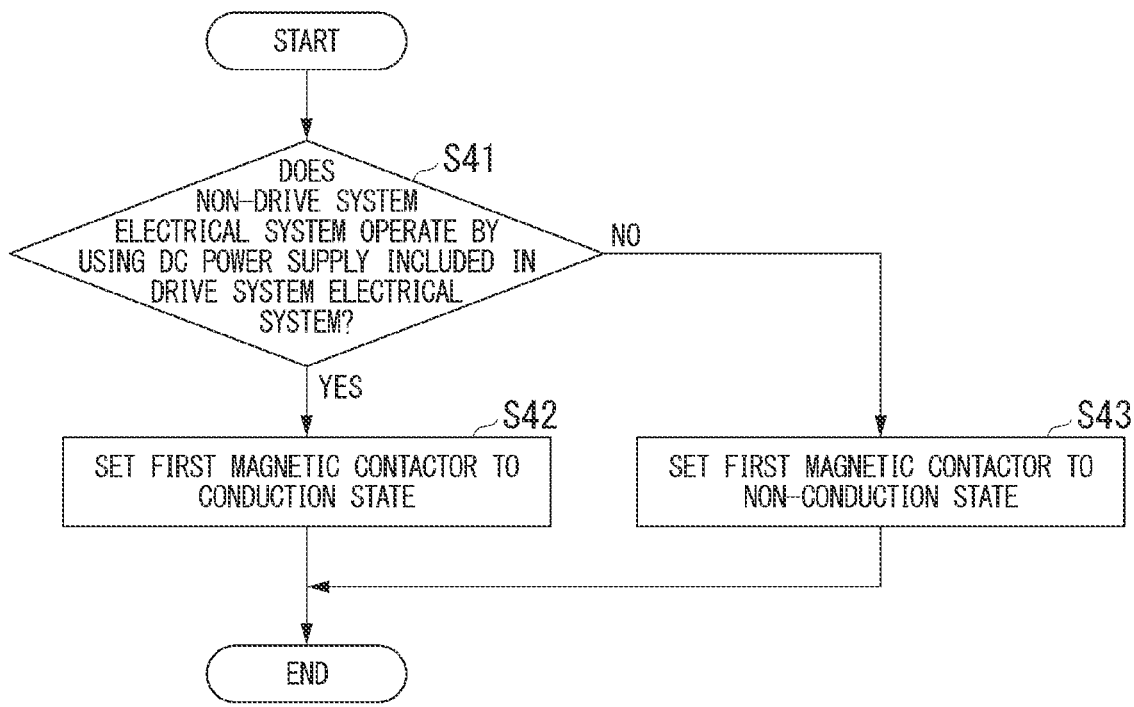
FIG. 4 is a diagram which shows an example of first control processing executed by the vehicle control device according to the embodiment.

Next, the first control processing executed by the vehicle control device according to the embodiment will be described with reference to FIG. 4. FIG. 4 is a diagram which shows an example of first control processing executed by the vehicle control device according to the embodiment.

In step S41, the magnetic contactor control unit 810 determines whether the non-drive system electrical system 60 operates by using the DC power supply 11 included in the drive system electrical system 10. When the magnetic contactor control unit 810 determines that the non-drive system electrical system 60 operates by using the DC power supply 11 included in the drive system electrical system 10 (YES in step S41), the processing proceeds to step S42. On the other hand, when the magnetic contactor control unit 810 determines that the non-drive system electrical system 60 does not operate by using the DC power supply 11 included in the drive system electrical system 10 (NO in step S41), the processing proceeds to step S43.

In step S42, the magnetic contactor control unit 810 sets the first magnetic contactor to the conduction state. That is, the magnetic contactor control unit 810 sets the magnetic contactor 71 and the magnetic contactor 72 to the conduction state.

In step S43, the magnetic contactor control unit 810 sets the first magnetic contactor to the non-conduction state. That is, the magnetic contactor control unit 810 sets the magnetic contactor 71 and the magnetic contactor 72 to the non-conduction state.

Figure 5:
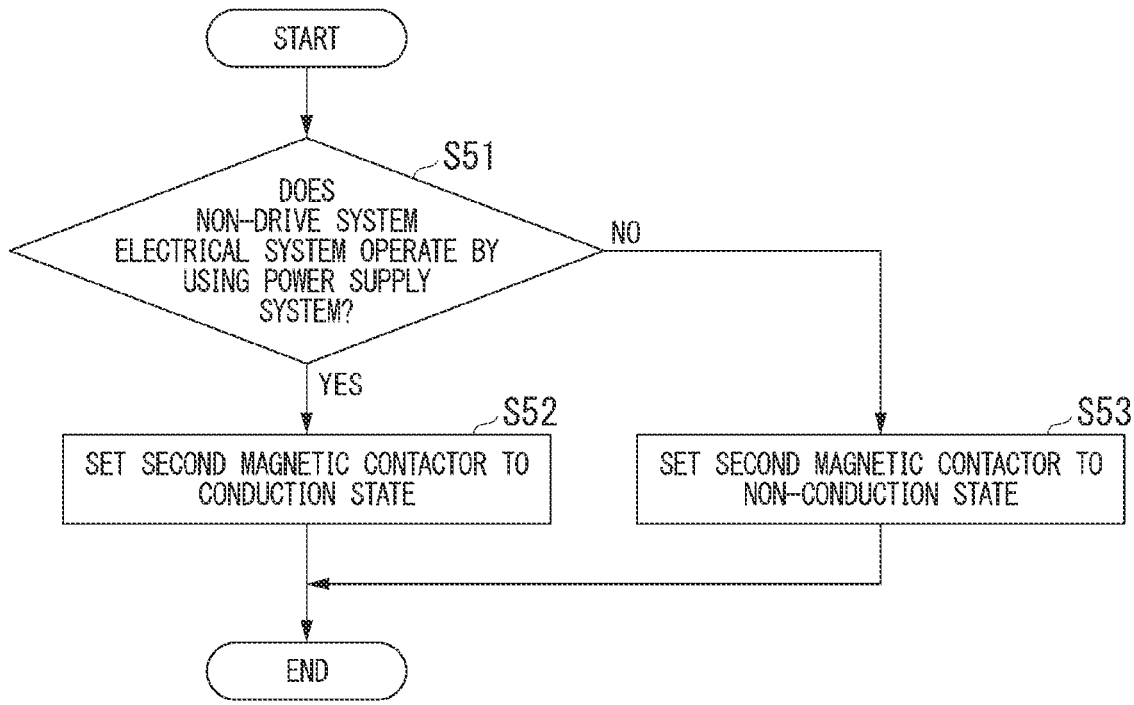
FIG. 5 is a diagram which shows an example of second control processing executed by the vehicle control device according to the embodiment.

Next, the second control processing executed by the vehicle control device according to the embodiment will be described with reference to FIG. 5. FIG. 5 is a diagram which shows an example of the second control processing executed by the vehicle control device according to the embodiment.

In step S51, the magnetic contactor control unit 810 determines whether the non-drive system electrical system 60 operates by using the power supply system 40. When the magnetic contactor control unit 810 determines that the non-drive system electrical system 60 operates by using the power supply system 40 (YES in step S51), the processing proceeds to step S52. On the other hand, when the magnetic contactor control unit 810 determines that the non-drive system electrical system 60 does not operate by using the power supply system 40 (NO in step S51), the processing proceeds to step S53.

In step S52, the magnetic contactor control unit 810 sets the second magnetic contactor to the conduction state. That is, the magnetic contactor control unit 810 sets the magnetic contactor 51 and the magnetic contactor 52 to the conduction state.

In step S53, the magnetic contactor control unit 810 sets the second magnetic contactor to the non-conduction state. That is, the magnetic contactor control unit 810 sets the magnetic contactor 51 and the magnetic contactor 52 to the non-conduction state.

Figure 6:
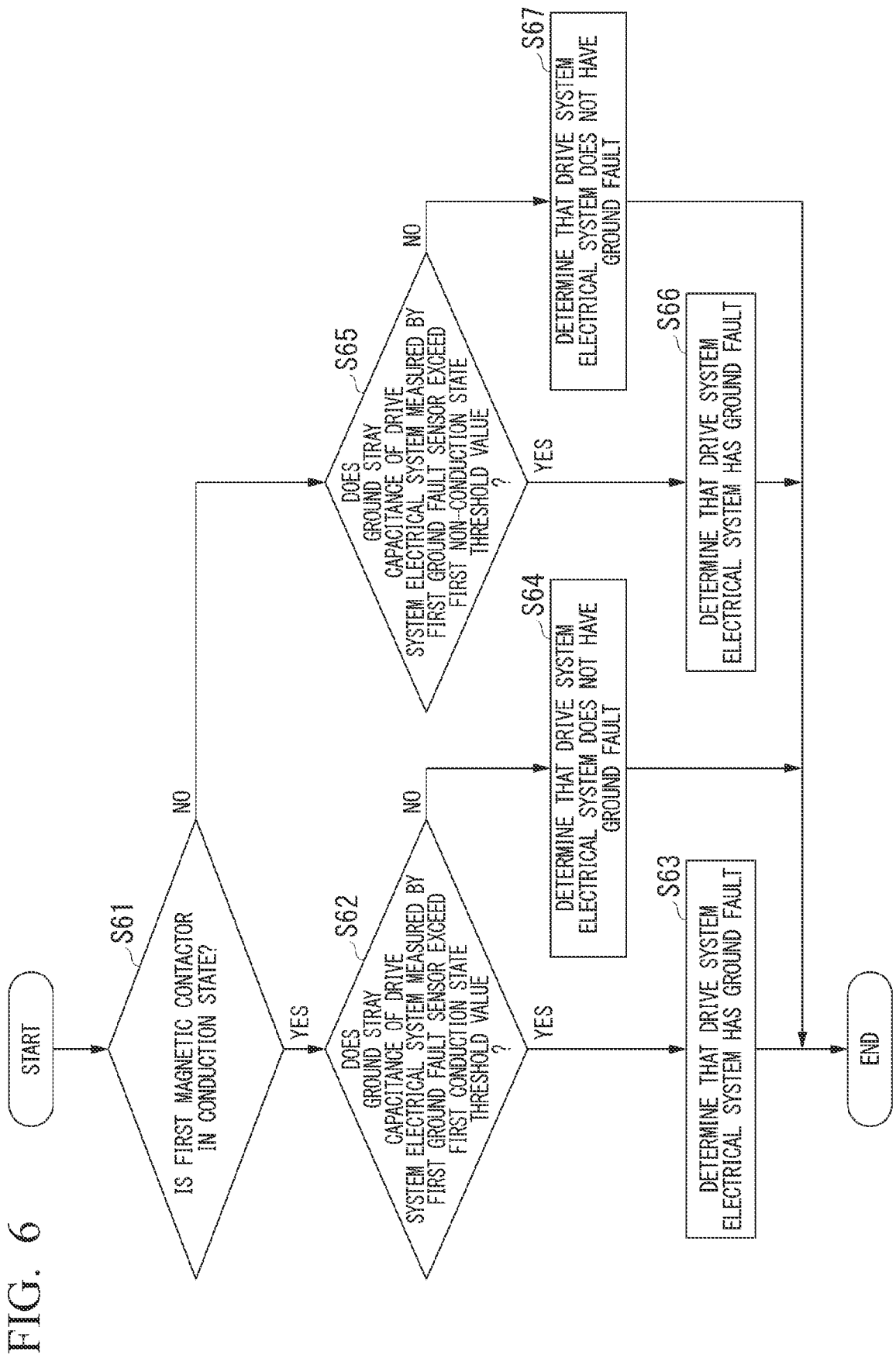
FIG. 6 is a flowchart which shows an example of processing executed by a first ground fault determination unit according to the embodiment.

Next, processing executed by the first ground fault determination unit according to the embodiment will be described with reference to FIG. 6. FIG. 6 is a flowchart which shows an example of the processing executed by the first ground fault determination unit according to the embodiment.

In step S61, the first ground fault determination unit 821 determines whether the first magnetic contactor is in the conduction state. That is, the first ground fault determination unit 821 determines whether the magnetic contactor 71 and the magnetic contactor 72 are in the conduction state. When the first ground fault determination unit 821 determines that the first magnetic contactor is in the conduction state (YES in step S61), the processing proceeds to step S62. On the other hand, when the first ground fault determination unit 821 determines that the first magnetic contactor is in the non-conduction state (NO in step S61), the processing proceeds to step S65.

In step S62, the first ground fault determination unit 821 determines whether the ground stray capacitance of the drive system electrical system 10 measured by the first ground fault sensor 15 exceeds the first conduction state threshold value. When the first ground fault determination unit 821 determines that the ground stray capacitance of the drive system electrical system 10 measured by the first ground fault sensor 15 exceeds the first conduction state threshold value (YES in step S62), the processing proceeds to step S63. On the other hand, when the first ground fault determination unit 821 determines that the ground stray capacitance of the drive system electrical system 10 measured by the first ground fault sensor 15 is equal to or less than the first conduction state threshold value (NO in step S62), the processing proceeds to step S64.

In step S63, the first ground fault determination unit 821 determines that the drive system electrical system 10 has a ground fault.

In step S64, the first ground fault determination unit 821 determines that the drive system electrical system 10 does not have a ground fault.

In step S65, the first ground fault determination unit 821 determines whether the ground stray capacitance of the drive system electrical system 10 measured by the first ground fault sensor 15 exceeds the first non-conduction state threshold value. When the first ground fault determination unit 821 determines that the ground stray capacitance of the drive system electrical system 10 measured by the first ground fault sensor 15 exceeds the first non-conduction state threshold value (YES in step S65), the processing proceeds to step S66. On the other hand, when the first ground fault determination unit 821 determines that the ground stray capacitance of the drive system electrical system 10 measured by the first ground fault sensor 15 is equal to or less than the first non-conduction state threshold value (NO in step S65), the processing proceeds to step S67.

In step S66, the first ground fault determination unit 821 determines that the drive system electrical system 10 has a ground fault.

In step S67, the first ground fault determination unit 821 determines that the drive system electrical system 10 does not have a ground fault.

Figure 7:
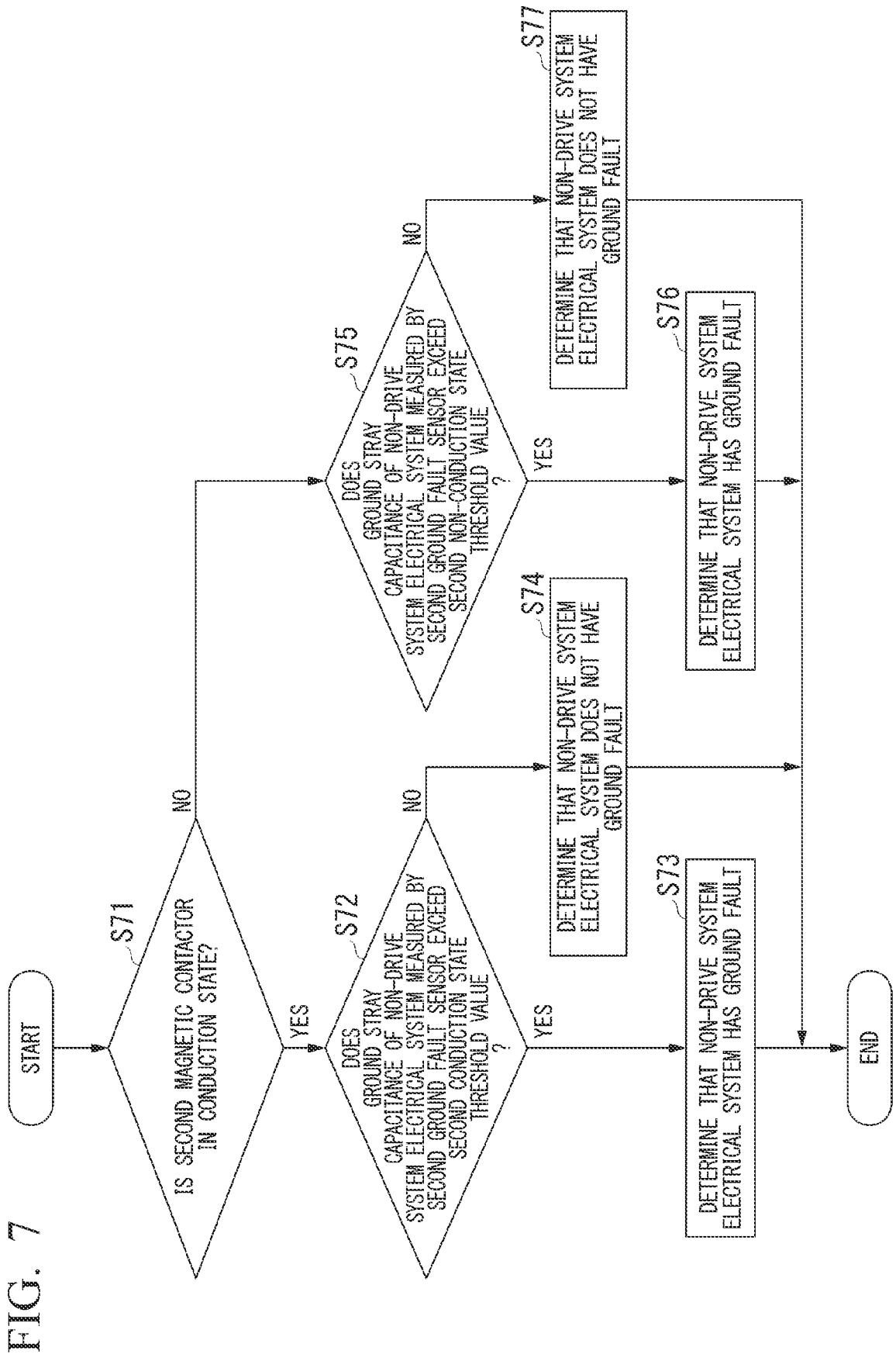
FIG. 7 is a flowchart which shows an example of processing executed by a second ground fault determination unit according to the embodiment.

Next, processing executed by the second ground fault determination unit according to the embodiment will be described with reference to FIG. 7. FIG. 7 is a flowchart which shows an example of the processing executed by the second ground fault determination unit according to the embodiment.

In step S71, the second ground fault determination unit 822 determines whether the second magnetic contactor is in the conduction state. That is, the second ground fault determination unit 822 determines whether the magnetic contactor 51 and the magnetic contactor 52 are in the conduction state. When the second ground fault determination unit 822 determines that the second magnetic contactor is in the conduction state (YES in step S71), the processing proceeds to step S72. On the other hand, when the second ground fault determination unit 822 determines that the second magnetic contactor is in the non-conduction state (NO in step S71), the processing proceeds to step S75.

In step S72, the second ground fault determination unit 822 determines whether the ground stray capacitance of the non-drive system electrical system 60 measured by the second ground fault sensor 63 exceeds the second conduction state threshold value. When the second ground fault determination unit 822 determines that the ground stray capacitance of the non-drive system electrical system 60 measured by the second ground fault sensor 63 exceeds the second conduction state threshold value (YES in step S72), the processing proceeds to step S73. On the other hand, when the second ground fault determination unit 822 determines that the ground stray capacitance of the non-drive system electrical system 60 measured by the second ground fault sensor 63 is equal to or less than the second conduction state threshold value (NO in step S72), the processing proceeds to step S74.

In step S73, the second ground fault determination unit 822 determines that the non-drive system electrical system 60 has a ground fault.

In step S74, the second ground fault determination unit 822 determines that the non-drive system electrical system 60 does not have a ground fault.

In step S75, the second ground fault determination unit 822 determines whether the ground stray capacitance of the non-drive system electrical system 60 measured by the second ground fault sensor 63 exceeds the second non-conduction state threshold value. When the second ground fault determination unit 822 determines that the ground stray capacitance of the non-drive system electrical system 60 measured by the second ground fault sensor 63 exceeds the second non-conduction state threshold value (YES in step S75), the processing proceeds to step S76. On the other hand, when the second ground fault determination unit 822 determines that the ground stray capacitance of the non-drive system electrical system 60 measured by the second ground fault sensor 63 is equal to or less than the second non-conduction state threshold value (NO in step S75), the processing proceeds to step S77.

In step S76, the second ground fault determination unit 822 determines that the non-drive system electrical system 60 has a ground fault.

In step S77, the second ground fault determination unit 822 determines that the non-drive system electrical system 60 does not have a ground fault.

The vehicle 1 and the vehicle control device 80 according to the embodiment have been described above. The vehicle control device 80 executes the first control processing of setting the first magnetic contactor to the non-conduction state when the non-drive system electrical system 60 does not operate by using the DC power supply 11 included in the drive system electrical system 10. As a result, when the non-drive system electrical system 60 does not operate by using the DC power supply 11 included in the drive system electrical system 10, the vehicle 1 sets the first magnetic contactor to the non-conduction state and reduces time during which power is supplied from the drive system electrical system 10 to the non-drive system electrical system 60.

The vehicle control device 80 executes the second control processing of setting the second magnetic contactor to the non-conduction state when the non-drive system electrical system 60 does not operate by using the power supply system 40.

When the non-drive system electrical system 60 does not operate by using the power supply system 40, the vehicle 1 sets the second magnetic contactor to the non-conduction state, and reduces time during which power is supplied from the power supply system 40 to at least one of the non-drive system electrical system 60 and the drive system electrical system 10.

Therefore, the vehicle 1 can reduce time during which power is supplied to at least one of an electronic device included in the non-drive system electrical system 60 and an electronic device included in the drive system electrical system 10, and suppress a deterioration of these electronic devices.

When the first magnetic contactor is in the conduction state, the first ground fault determination unit 821 determines that the drive system electrical system 10 has a ground fault when the ground stray capacitance of the drive system electrical system 10 measured by the first ground fault sensor 15 included in the drive system electrical system 10 exceeds the first conduction state threshold value. As a result, the vehicle 1 determines whether the drive system electrical system 10 has a ground fault by using the first conduction state threshold value set according to a range that the ground stray capacitance of the drive system electrical system 10 can take when the first magnetic contactor is in the conduction state.

On the other hand, when the first magnetic contactor is in the non-conduction state, the first ground fault determination unit 821 determines that the drive system electrical system 10 has a ground fault when the ground stray capacitance of the drive system electrical system 10 measured by the first ground fault sensor 15 exceeds the first non-conduction state threshold value, which is different from the first conduction state threshold value. As a result, the vehicle 1 determines whether the drive system electrical system 10 has a ground fault by using the first non-conduction state threshold value set according to the range in which the ground stray capacitance of the drive system electrical system 10 can take when the first magnetic contactor is in the non-conduction state.

Therefore, the vehicle 1 determines accurately whether the drive system electrical system 10 has a ground fault regardless of whether the first magnetic contactor is in the conduction state or when the first magnetic contactor is in the non-conduction state.

When the second magnetic contactor is in the conduction state, the second ground fault determination unit 822 determines that the non-drive system electrical system 60 has a ground fault when the ground stray capacitance of the non-drive system electrical system 60 measured by the second ground fault sensor 64 included in the non-drive system electrical system 60 exceeds the second conduction state threshold value. As a result, the vehicle 1 determines whether the non-drive system electrical system 60 has a ground fault by using the second conduction state threshold value set according to the range in which the ground stray capacitance of the non-drive system electrical system 60 can take when the second magnetic contactor is in the conduction state.

On the other hand, when the second magnetic contactor is in the non-conduction state, the second ground fault determination unit 822 determines that the non-drive system electrical system 60 has a ground fault when the ground stray capacitance of the non-drive system electrical system 60 measured by the second ground fault sensor 64 exceeds the second non-conduction state threshold value, which is different from the second conduction state threshold value. As a result, the vehicle 1 determine whether the non-drive system electrical system 60 has a ground fault by using the second non-conduction state threshold value set according to the range in which the ground stray capacitance of the non-drive system electrical system 60 can take when the second magnetic contactor is in the non-conduction state.

Therefore, the vehicle 1 can determine accurately whether the non-drive system electrical system 60 has a ground fault regardless of when the second magnetic contactor is in the conduction state or when the second magnetic contactor is in the non-conduction state.

The embodiment of the present invention has been described above with reference to the drawings. However, the vehicle, the vehicle control device, the vehicle control program, the vehicle control method and the storage medium are not limited to the embodiment described above, and at least one of various modifications, substitutions, combinations, and design changes can be made within a range not departing from the gist of the present invention.

An effect of the embodiment of the present invention described above is the effect described as an example. Therefore, the embodiment of the present invention may also exert other effects that can be recognized by those skilled in the art from the description of the embodiment described above, in addition to the effect described above.

What is claimed is:

1. A vehicle comprising:
a drive system electrical system configured to supply power to a driver system;
a non-drive system electrical system configured to supply power to a non-drive system;
a first magnetic contactor that is electrically connected between the drive system electrical system and the non-drive system electrical system;
a second magnetic contactor that is electrically connected between a power supply system configured to supply power to the non-drive system electrical system and the non-drive system electrical system;
a magnetic contactor control unit configured to execute at least one of first control processing of setting the first magnetic contactor to a non-conduction state when the non-drive system electrical system does not operate by using a DC power supply included in the drive system electrical system and second control processing of setting the second magnetic contactor to a non-conduction state when the non-drive system electrical system does not operate by using the power supply system; and
a drive system ground fault determination unit configured to determine that, when the first magnetic contactor is in a conduction state, the drive system electrical system has a ground fault when a ground stray capacitance of the drive system electrical system measured by a drive system ground fault sensor included in the drive system electrical system exceeds a drive system conduction state threshold value, and
to determine that, when the first magnetic contactor is in a non-conduction state, the drive system electrical system has a ground fault when the ground stray capacitance of the drive system electrical system measured by the drive system ground fault sensor exceeds a drive system non-conduction state threshold value, which is different from the drive system conduction state threshold value.

2. The vehicle according to claim 1, further comprising: the power supply system.

3. A vehicle comprising:
a drive system electrical system configured to supply power to a driver system;
a non-drive system electrical system configured to supply power to a non-drive system;
a first magnetic contactor that is electrically connected between the drive system electrical system and the non-drive system electrical system;
a second magnetic contactor that is electrically connected between a power supply system configured to supply power to the non-drive system electrical system and the non-drive system electrical system;
a magnetic contactor control unit configured to execute at least one of first control processing of setting the first magnetic contactor to a non-conduction state when the non-drive system electrical system does not operate by using a DC power supply included in the drive system electrical system and second control processing of setting the second magnetic contactor to a non-conduction state when the non-drive system electrical system does not operate by using the power supply system; and
a non-drive system ground fault determination unit configured
to determine that, when the second magnetic contactor is in a conduction state, the non-drive system electrical system has a ground fault when a ground stray capacitance of the non-drive system electrical system measured by a non-drive system ground fault sensor included in the non-drive system electrical system exceeds a non-drive system conduction state threshold value, and
to determine that, when the second magnetic contactor is in a non-conduction state, the non-drive system electrical system has a ground fault when the ground stray capacitance of the non-drive system electrical system measured by the non-drive system ground fault sensor exceeds a non-drive system non-conduction state threshold value, which is different from the non-drive system conduction state threshold value.

4. A vehicle control device comprising:
a magnetic contactor control unit configured to execute at least one of first control processing of setting a first magnetic contactor electrically connected between a non-drive system electrical system, which supplies power to a non-drive system of a vehicle, and a drive system electrical system, which supplies power to a drive system of the vehicle, to a non-conduction state when the non-drive system electrical system does not operate by using a DC power supply included in the drive system electrical system and second control processing of setting a second magnetic contactor electrically connected between the non-drive system electrical system and a power supply system to the non-conduction state when the non-drive system electrical system does not operate by using the power supply system that supplies power to the non-drive system electrical system; and a drive system ground fault determination unit configured
to determine that, when the first magnetic contactor is in a conduction state, the drive system electrical system has a ground fault when a ground stray capacitance of the drive system electrical system measured by a drive system ground fault sensor included in the drive system electrical system exceeds a drive system conduction state threshold value, and
to determine that, when the first magnetic contactor is in a non-conduction state, the drive system electrical system has a ground fault when the ground stray capacitance of the drive system electrical system measured by the drive system ground fault sensor exceeds a drive system non-conduction state threshold value, which is different from the drive system conduction state threshold value.

5. A computer-readable non-transitory storage medium that stores a vehicle control program causing a computer to execute:
realizing a first vehicle control function of including a magnetic contactor control unit that executes at least one of first control processing of setting a first magnetic contactor electrically connected between a non-drive system electrical system, which supplies power to a non-drive system of a vehicle, and a drive system electrical system, which supplies power to a drive system of the vehicle, to a non-conduction state when the non-drive system electrical system does not operate by using a DC power supply included in the drive system electrical system and second control processing of setting a second magnetic contactor electrically connected between the non-drive system electrical system and a power supply system to the non-conduction state when the non-drive system electrical system does not operate by using the power supply system that supplies power to the non-drive system electrical system; and
realizing a second vehicle control function of including a drive system ground fault determination unit that executes
determining that, when the first magnetic contactor is in a conduction state, the drive system electrical system has a ground fault when a ground stray capacitance of the drive system electrical system measured by a drive system ground fault sensor included in the drive system electrical system exceeds a drive system conduction state threshold value, and
determining that, when the first magnetic contactor is in a non-conduction state, the drive system electrical system has a ground fault when the ground stray capacitance of the drive system electrical system measured by the drive system ground fault sensor exceeds a drive system non-conduction state threshold value, which is different from the drive system conduction state threshold value.

6. A vehicle control method comprising:
by a computer,
executing at least one of first control processing of setting a first magnetic contactor electrically connected between a non-drive system electrical system, which supplies power to a non-drive system of a vehicle, and a drive system electrical system, which supplies power to a drive system of the vehicle, to a non-conduction state when the non-drive system electrical system does not operate by using a DC power supply included in the drive system electrical system and second control processing of setting a second magnetic contactor electrically connected between the non-drive system electrical system and a power supply system to the non-conduction state when the non-drive system electrical system does not operate by using the power supply system that supplies power to the non-drive system electrical system; and
determining that, when the first magnetic contactor is in a conduction state, the drive system electrical system has a ground fault when a ground stray capacitance of the drive system electrical system measured by a drive system ground fault sensor included in the drive system electrical system exceeds a drive system conduction state threshold value, and
determining that, when the first magnetic contactor is in a non-conduction state, the drive system electrical system has a ground fault when the ground stray capacitance of the drive system electrical system measured by the drive system ground fault sensor exceeds a drive system non-conduction state threshold value, which is different from the drive system conduction state threshold value.

\* \* \* \* \*